Figure 1:
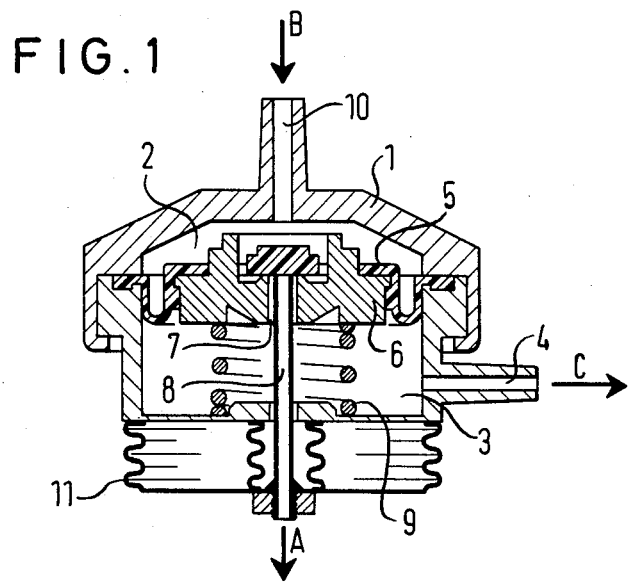

United States Patent [19]

Piesche

[11] Patent Number: 4,622,815
[45] Date of Patent: Nov. 18, 1986

[54] PRESSURE REGULATOR

[75] Inventor: Günter Piesche, Ubstadt-Weiher, Fed. Rep. of Germany

[73] Assignee: Ranco Incorporated, Dublin, Ohio

[21] Appl. No.: 485,577

[22] PCT Filed: Oct. 21, 1982

[86] PCT No.: PCT/EP82/00233
§ 371 Date: Apr. 4, 1983
§ 102(e) Date: Apr. 4, 1983

[30] Foreign Application Priority Data

Oct. 21, 1981 [DE] Fed. Rep. of Germany ... 8130788[U]

[51] Int. Cl.$^4$ .............................................. F02D 23/00
[52] U.S. Cl. .................................... 60/602; 137/81.1; 137/116.3; 137/116.5
[58] Field of Search ................ 137/116.5, 81.1, 116.3; 60/602

[56] References Cited

U.S. PATENT DOCUMENTS

| 1,903,338 | 4/1933 | Horne | 137/116.5 |
| 2,376,199 | 5/1945 | Shoults | 60/13 |
| 2,596,178 | 5/1952 | Seeler | 137/81.1 |
| 3,035,408 | 5/1962 | Silver | 60/602 |
| 3,125,111 | 3/1964 | Daly | 137/102 |
| 3,611,711 | 10/1971 | Mueller | 60/13 |
| 4,108,197 | 8/1978 | Brakebill | 137/81.1 |
| 4,283,912 | 8/1981 | Cholvin | 60/602 |
| 4,391,290 | 7/1983 | Williams | 137/81.1 |

FOREIGN PATENT DOCUMENTS 0035691 9/1981 European Pat. Off. .
2039610 8/1980 United Kingdom .

Primary Examiner—A. Michael Chambers
Attorney, Agent, or Firm—Watts, Hoffmann, Fisher & Heinke Co.

[57] ABSTRACT

A pressure regulator comprises a high-pressure chamber (2), and an atmospheric pressure chamber (3) having an opening (4) for controlled high-pressure (C), between which a diaphragm (5) is disposed having a sealing disc (6) resiliently movable in relation thereto, said diaphragm (5) selectively closing both an atmospheric pressure input port (8) and a through port (7) between high-pressure chamber (2) and atmospheric pressure chamber (3) in the sealing disc (6), and said sealing disc (6) being pressed towards the diaphragm (5) under the action of at least one spring (9). In order to permit a control of the high-pressure dependent on atmospheric pressure, for example of the boost pressure of a turbo charger for internal combustion engines, the pressure regulator has a bellow (11) responding to changes in the atmospheric pressure (A) for changing the bias of the spring (9) upon changing atmospheric pressure (A). The action of the bellow (11) on the spring bias is expediently adjustable.

8 Claims, 5 Drawing Figures

PRESSURE REGULATOR

The invention relates to a pressure regulator comprising a high-pressure chamber and an atmospheric pressure chamber having an opening for controlled high pressure, between which a diaphragm is disposed having a sealing disc resiliently movable in relation thereto, said diaphragm selectively closing both an atmospheric pressure input port and a through port between high-pressure chamber and atmospheric pressure chamber in the sealing disc and said sealing disc being pressed towards the diaphragm under the action of at least one spring.

In the control of turbo chargers for internal combustion engines, a waste gate valve is used, which is acted upon by the high-pressure (boost pressure) of the turbo charger and opens when a certain pressure is reached, so that the turbine operated by the waste gas pressure receives a by-pass and hereby the number of revolutions and accordingly the boost pressure does not further increase. In the case of low atmospheric pressure in great altitudes, this results in the effect that the boost pressure is reduced in an undesirable manner, as the waste gate valve opens wider in this case than in the case of high barometric pressure.

The invention is based on the object of constructing a pressure regulator of the type described above which produces a controlled high-pressure in such a manner that the controlled high-pressure, especially a controlled boost pressure of a turbo charger, is purposefully influenced dependent on changes in the atmospheric pressure and according to a pre-determined characteristic.

According to the invention, this object is solved in that the pressure regulator has means responding to changes in the atmospheric pressure for increasing or decreasing, respectively, the bias of the spring upon sinking atmospheric pressure. In the case of a turbo charger for internal combustion engines, this regulator is acted upon by the high-pressure of the turbo charger and delivers a controlled boost pressure to the waste gate valve which ensures that upon sinking atmospheric pressure, especially in great altitudes, the boost pressure cannot drop in an undesirable manner.

The means responding to changes in the atmospheric pressure is advantageously an aneroid bellow connected with the atmospheric pressure input port and shifting same in relation to the sealing disc. In this respect, the, for example, tubular atmosphere input port is expediently adjustably mounted on the aneroid bellow in order to permit an adjustment of the response threshold of the pressure regulator.

The means responding to changes in atmospheric pressure can also advantageously be an aneroid bellow connected with a counterspring, acting on the sealing disc and changing the bias thereof, whereby according to a development of this embodiment of the invention, the counterspring is adjustably connected with the aneroid bellow.

A further embodiment of the pressure regulator according to the invention is characterized in that the means responding to changes in the atmospheric pressure is a bellow in the high-pressure chamber, said bellow being in communication with the sealing disc and acting contrary to the spring, and the interior thereof being open towards the atmosphere. In this respect, in the interior of the bellow a counterspring can be arranged, acting on the sealing disc, the bias of said spring being expediently adjustable.

According to a further development of the pressure regulator of to the invention, an electromagnet is disposed therein, via the armature of which a force in the direction of action of the spring can be applied to the sealing disc, resulting in an additional possibility for influencing the controlled high-pressure delivered by the pressure regulator. It is a matter of course that in the event that the electromagnet is energized dependent on atmospheric pressure, the means responding to changes in atmospheric pressure can also be omitted.

The electromagnet is expediently constructed for energization with a pulsed current, whereby it can be used together with a digital electronic system.

Figure 2:
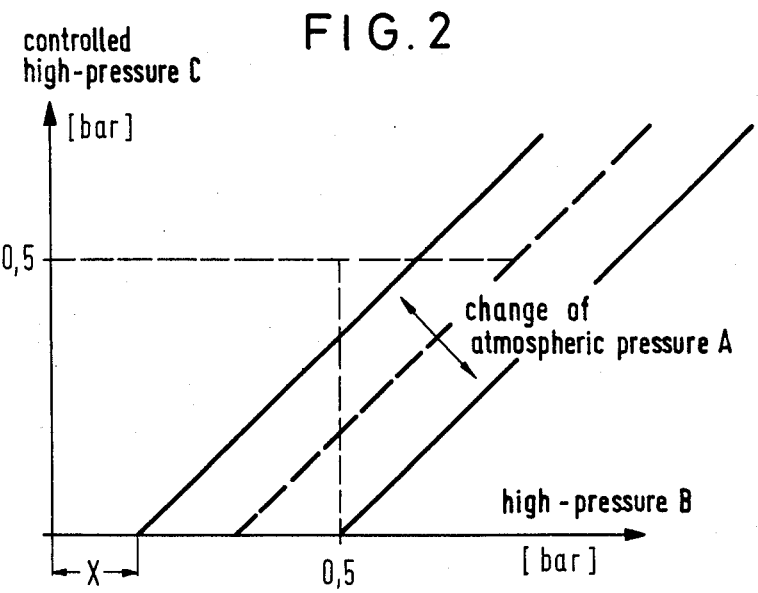
Figure 3:
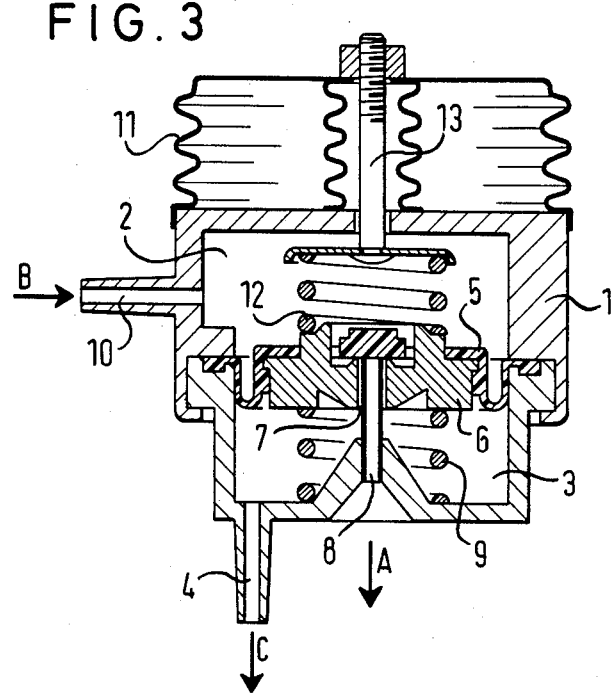
Figure 4:
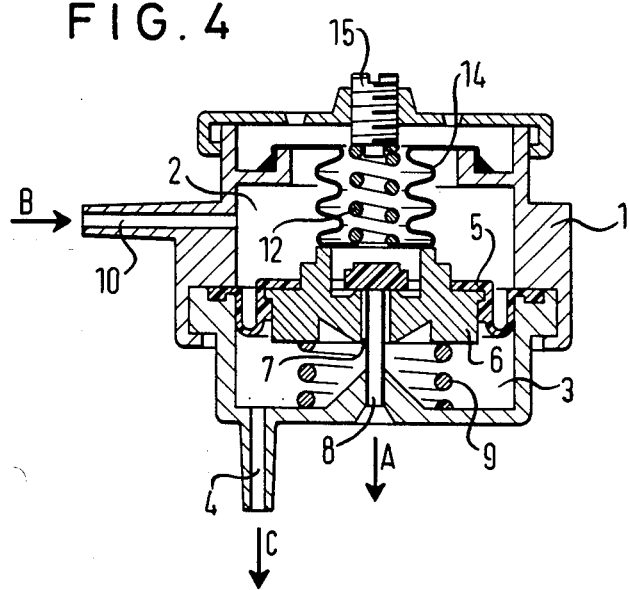
Figure 5:
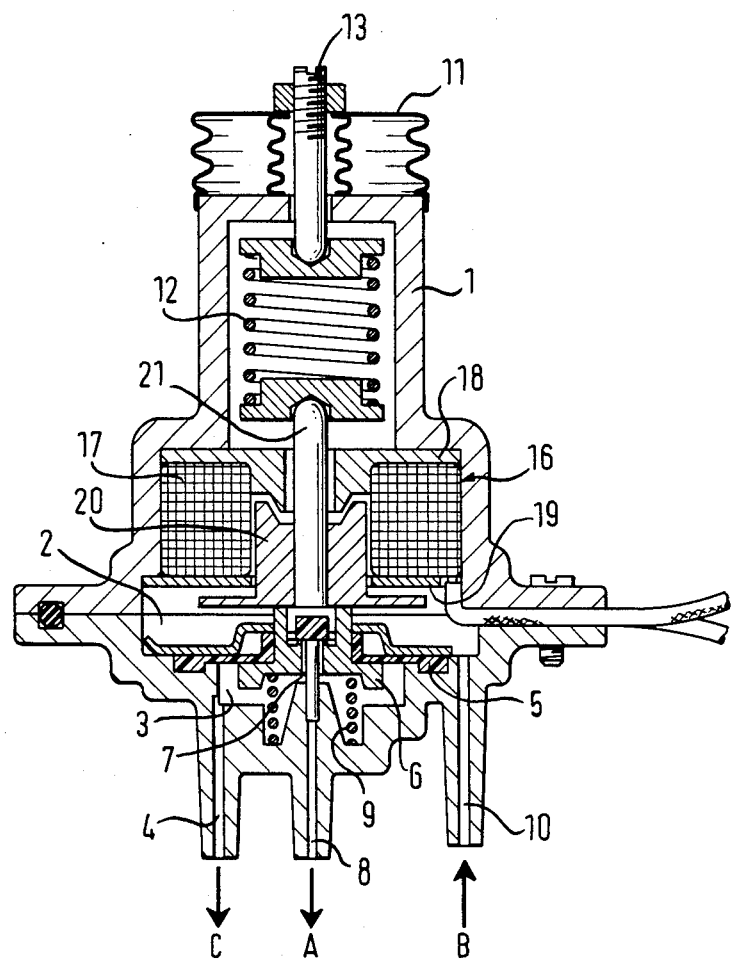

The invention is explained in more detail in the following on the basis of embodiments and with reference to the drawings. In the drawings show FIG. 1 a cross-section through an embodiment of the pressure regulator according to the invention;

FIG. 2 a graphic representation of the controlled high-pressure versus the high-pressure fed to the pressure regulator;

FIG. 3 a cross-section through a further embodiment of the pressure regulator according to the invention;

FIG. 4 a cross section through a third embodiment of the pressure regulator according to the invention, and FIG. 5 a cross-section through a further embodiment of the pressure regulator according to the invention with an additional electromagnet.

The pressure regulator represented in FIG. 1 shows a housing 1 with a high-pressure chamber 2 and an atmospheric pressure chamber 3 having an opening 4 for controlled high-pressure. Between the high-pressure chamber 2 and the atmospheric pressure chamber 3, a diaphragm 5 is disposed, with a sealing disc 6 resiliently movable in relation thereto. A through port 7 in the sealing disc 6 connects the high-pressure chamber 2 with the atmospheric pressure chamber 3. According to the position of the sealing disc 6 with respect to the diaphragm 5, the through port 7 is opened or closed by the diaphragm 5. According to its position, the sealing disc 6 also closes a tubular atmospheric pressure input port 8. A spring 9 in the form of a helical compression spring presses the sealing disc 6 towards the diaphragm 5. Via an opening 10, a high-pressure B, for example the boost pressure of a turbo charger, is fed to the pressure regulator.

The tubular atmospheric pressure input port 8 is adjustably screwed into the bottom of an aneroid bellow 11 mounted in an air-tight manner on the bottom of the pressure regulator.

The pressure present in the atmospheric pressure chamber 3 is controlled as follows for delivering a controlled high-pressure C with the aid of the diaphragm 5 and the sealing disc 6:

Initially there is a slight high-pressure B in the high-pressure chamber 2 on the diaphragm 5. The spring 9 presses the sealing disc 6 against the diaphragm 5 and against the housing 1. In this way, the atmospheric pressure chamber 3 is connected with the atmospheric pressure A via the open atmospheric pressure input port 8. By increase of the high-pressure B, the diaphragm 5 is moved downwards against the tension of the spring 9 and seals off the atmospheric pressure input port 8. At the same time, the seal opens between the sealing disc 6 and the diaphragm 5. Accordingly, high-pressure reaches the atmospheric pressure chamber 3 and builds up a counterpressure on the bottom of the diaphragm 5 to an amount providing a balance of forces and leads to a closing of the through port 7 in the sealing disc 6 by the diaphragm 5. The controlled high-pressure C in the atmospheric pressure chamber 3 adjusts itself so that it is equal to the high-pressure B less the spring tension, commencing with the pressure X resulting from the bias of spring 9, according to the diagram of FIG. 2.

The bottom of the aneroid bellow 11, which is evacuated or filled with a defined internal pressure, defines the position of the tubular atmospheric pressure input port 8 and is moved downwards in the event of a reducing atmospheric pressure A, by relaxing the aneroid bellow 11. This results in a new position of the inner tube end of the atmospheric pressure input port 8, which means that to achieve the balance of forces on the diaphragm 5 a higher bias of the spring 9 needs to be overcome. This leads to the fact that the pressure X resulting from the bias increases so that a reduced, controlled high-pressure C, corrected according to the atmospheric pressure A, is associated to every high-pressure B.

The controlled high-pressure C is fed for example to the waste gate valve of a turbo charger, whereby a stablilized boost pressure results in the case of a decreasing atmospheric pressure A, for example in great altitudes.

In the embodiment of the pressure regulator according to the invention represented in FIG. 3, the increase of the spring bias does not take place by a change in the position of the atmospheric pressure input port 8, but rather a counterspring 12 acting on the sealing disc 6 contrary to the spring 9 is provided, also in the form of a helical compression spring. The aneroid bellow 11 changes the bias of the counterspring 12 here via a ram 13. The ram 13 is adjustably screwed into the bottom of the aneriod bellow 11 mounted on the upper side of the pressure regulator and movable via same.

In the embodiment of the pressure regulator according to the invention shown in FIG. 4, instead of the aneroid bellow 11, a bellow 14 is provided in the high-pressure chamber 2, said bellow 14 being in connection with the sealing disc 6 and acting contrary to the spring 9, and the interior thereof being open towards the atmosphere. Inside the bellow 14 a counterspring 12 is further provided acting on the sealing disc 6, the bias of which is said counterspring being adjustable.

As the interior of the bellow 14 is open towards the atmosphere, a change additionally occurs in the steepness of the diagram lines in FIG. 2 by relieving the counterspring 12 via the bellow 14 by the high-pressure B, however, upon reduction of the atmospheric pressure A as a result of differing barometric altitudes, a correction also takes place in the respect that the lesser atmospheric pressure results in a lesser bellow force on the sealing disc 6. An adjustment can be performed by the adjustment screw 15, by means of which the bias of the counter spring 12 is changed.

FIG. 5 shows a further embodiment of the pressure regulator according to the invention, wherein additionally an electromagnet 16 with a coil 17, pole plates 18 and 19 and an armature 20 with ram 21 are provided in the pressure regulator. Upon energization of the electromagnet 16, a force is applied to the sealing disc 6 in the direction of action of the spring 9, via which the controlled high-pressure C can be additionally reduced, as the force exerted by the electromagnet 16 additionally effects the state of equilibrium of the system. It is a matter of course that the pressure regulator can also be operated without the aneroid bellow 11 if the electromagnet 16 is energized by an electronic system responding to changes in the atmospheric pressure. In order to be able to use the electromagnets 16 with a digital electronic system, this is expediently constructed for energization with a pulsed current.

The pressure regulator represented in FIG. 5 can also be provided with a bellow 14 open towards the atmosphere according to the embodiment of FIG. 4, instead of with an aneroid bellow 11.

I claim:

1. An altitude compensating turbocharger controller for an internal combustion engine, comprising:
   (a) a controller housing;
   (b) an aneroid bellows mounted to said housing;
   (c) a control valve assembly having a pressure input for receiving a positive pressure signal indicative of an output pressure of a turbocharger, an atmospheric pressure port connected to ambient air pressure, a control pressure output port, and valving structure defining a differential pressure responsive means including a diaphragm and associated sealing disc movable from a balanced position to alter communication between said control pressure port and one of said input and atmospheric pressure ports to change the control pressure, said differential pressure responsive means acted upon by differential pressure forces whose magnitude varies depending on sensed changes in ambient atmospheric pressure and the signal pressure;
   (d) a force transmitting member for transmitting force between said aneroid bellows and said differential pressure responsive means;
   (e) said force transmitting member effective to transmit biasing forces generated by said bellows to said differential pressure responsive means in response to sensed atmospheric pressure, said control pressure changing to produce a feedback pressure force on said differential pressure responsive means to oppose said bellows generated biasing force such that said diaphragm and sealing disc are maintained at said balanced position to produce a static control pressure that is a function of sensed atmospheric pressure and the output pressure of said turbocharger.

2. The controller of claim 1 wherein said force transmitting member comprises a spring acting on said sealing disc.

3. An altitude compensating turbocharger controller for an internal combustion engine, comprising:
   (a) a controller housing;
   (b) an aneroid capsule mounted to said housing, said capsule expansible in response to a sensed change in ambient atmospheric pressure;
   (c) a differential pressure responsive means including a diaphragm and sealing disc assembly for controlling the communication of a positive turbocharger output related signal pressure to a control pressure port, said differential pressure responsive means having one region exposed to said signal pressure and another region exposed to pressure at said control pressure port;
   (d) said assembly movable from a balanced position at which said control pressure port is sealed from both atmospheric pressure and the turbocharger output related signal pressure to a first position at which said signal pressure is communicated to said control pressure port or a second position in which said control pressure port is communicated with ambient atmospheric pressure;

(e) a force transmitting member for transmitting force between said aneroid capsule and said pressure differential responsive means;

(f) said force transmitting member operative to transmit biasing forces to said pressure differential responsive means generated by said aneroid capsule in response to sensed changes in atmospheric pressure, said biasing forces modifying a static control pressure at said control pressure port for a given turbocharger output related signal pressure in order to produce a feedback force on said assembly whereby said assembly is returned to its balanced position.

4. The controller of claim 3 wherein said force transmitting member acts on said sealing disc.

5. A turbocharger boost regulator for controlling the signal pressure communicated to a waste gate valve, comprising:

(a) a regulator housing;

(b) a movable diaphragm and associated sealing disc mounted in said housing, said diaphragm and sealing disc defining a pressure differential responsive means having a region for receiving a positive pressure signal indicative of a turbocharger output pressure and a second region exposed to an output pressure developed in a control pressure chamber in response to said turbocharger output pressure and sensed atmospheric pressure;

(c) said sealing disc carried by said diaphragm and including means for controlling fluid communication between said first region and said second region and between said second region and an atmospheric pressure port;

(d) an atmospheric sensing means for applying a force, related to atmospheric pressure, to said sealing disc such that changes in atmospheric pressure are manifested as a change in biasing force on said sealing disc;

(e) said sealing disc moving to adjust the pressure in the control pressure chamber such that a feedback force is generated on said differential pressure responsive means to produce a balanced force condition on said differential pressure responsive means whereupon said disc is returned to a balanced position at which a static control pressure is established in the control pressure chamber that is a function of atmospheric pressure and turbocharger output pressure.

6. The apparatus of claim 5 wherein said first region of said diaphragm at least partially defines an input chamber for receiving a turbocharger boost pressure and said second region at least partially defines a control pressure chamber in fluid communication with a waste gate valve.

7. A pressure regulator according to claim 5, further including an electromagnet and an associated armature operable to apply an additional biasing force to the sealing disc.

8. A pressure regulator according to claim 7, wherein the electromagnet is constructed for energization with a pulsed current.

* * * * *